(12) United States Patent
Finkelshtein et al.

(10) Patent No.: US 11,373,063 B2
(45) Date of Patent: Jun. 28, 2022

(54) SYSTEM AND METHOD FOR STAGED ENSEMBLE CLASSIFICATION

(71) Applicant: International Business Machines Corporation, Armonk, NY (US)

(72) Inventors: Andrey Finkelshtein, Beer Sheva (IL); Oded Margalit, Ramat Gan (IL); Eitan Menahem, Beer Sheva (IL)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 16/214,145

(22) Filed: Dec. 10, 2018

(65) Prior Publication Data

US 2020/0184254 A1 Jun. 11, 2020

(51) Int. Cl.
*G06K 9/62* (2022.01)
*G06N 3/12* (2006.01)
*G06N 20/20* (2019.01)

(52) U.S. Cl.
CPC .......... *G06K 9/626* (2013.01); *G06K 9/6281* (2013.01); *G06N 3/126* (2013.01)

(58) Field of Classification Search
None
See application file for complete search history.

(56) References Cited

U.S. PATENT DOCUMENTS

| | | | | |
|---|---|---|---|---|
| 11,010,472 B1 * | 5/2021 | Powers | ................ | G06N 5/003 |
| 11,210,397 B1 * | 12/2021 | Sharif | .................. | G06N 20/00 |
| 2016/0335432 A1 * | 11/2016 | Vatamanu | .............. | G06N 20/00 |
| 2017/0039418 A1 * | 2/2017 | Wang | ..................... | G06N 20/00 |
| 2017/0116515 A1 * | 4/2017 | Abel | .................... | G06N 3/0445 |
| 2017/0286839 A1 | 10/2017 | Parker | | |
| 2018/0034842 A1 | 2/2018 | Smyth et al. | | |

(Continued)

FOREIGN PATENT DOCUMENTS

| | | | | | |
|---|---|---|---|---|---|
| CN | 108256493 | A | * | 7/2018 | |
| CN | 109635633 | A | * | 4/2019 | |
| CN | 110046631 | A | * | 7/2019 | ............. G06F 17/00 |

(Continued)

OTHER PUBLICATIONS

Xiaoyong Yuan, "PhD Forum: Deep Learning-based Real-Time Malware Detection with Multi-Stage Analysis", 2017 IEEE International Conference on Smart Computing (SMARTCOMP), 2017.

*Primary Examiner* — Mohammed Rachedine
(74) *Attorney, Agent, or Firm* — G. E. Ehrlich

(57) ABSTRACT

A method for training thresholds controlling data flow in a plurality of cascaded classifiers for classifying malicious software, comprising: in each of a plurality of iterations: computing a set of scores, each for one of a set of threshold sequences, each threshold sequence is a sequence of sets of classifier output thresholds, each set of classifier output thresholds used to control a flow of data from a first cascaded classifier of the plurality of cascaded classifiers to a second cascaded classifier of the plurality of cascaded classifiers, each score computed when classifying, using the respective threshold sequence, each of a plurality of software objects as one of a set of maliciousness classes; computing a set of new threshold sequences by applying a genetic algorithm to the set of threshold sequences and the set of scores; and using the set of new threshold sequences in a consecutive iteration.

18 Claims, 10 Drawing Sheets

(56) References Cited

U.S. PATENT DOCUMENTS

2018/0096261 A1   4/2018   Chu et al.

FOREIGN PATENT DOCUMENTS

| CN | 104781828 B | * | 9/2020 | ......... G06K 9/00248 |
| CN | 109525577 B | * | 8/2021 | ............. G06N 3/084 |
| CN | 109272536 B | * | 11/2021 | ............... G06T 7/13 |
| WO | WO-2018036241 A1 | * | 3/2018 | |

* cited by examiner

SYSTEM AND METHOD FOR STAGED ENSEMBLE CLASSIFICATION

BACKGROUND

The present invention, in some embodiments thereof, relates to a system and method for classification of findings in input data and, more specifically, but not exclusively, to a system and method for classification of malicious software.

Computerized systems are used for classification of findings in input data in a variety of fields. Classification refers to predicting a class of the input data. For example, a plurality of medical test results of a patient may be processed by one or more classification models to determine whether the patient suffers from at least one of one or more possible diseases. Another example is user authentication for authorizing access to a resource. Another example is classification of software as malicious. A malicious software object is a software object that when executed by a computer based system or device acts against interests of a user of the executing system or device. Such a software object is sometimes referred to as malware. Some malicious software objects are computer applications or scripts. Some other malicious software objects are dynamically loaded libraries or application add-ons or application plug-ins. Some other malicious software objects are executed following access to a web site. A persistent problem in the field of cyber security is detecting when a software object performs computer actions for malicious purposes. A computer system may analyze a software object, and additionally or alternatively data collected when executing the software object, to classify the software object as malicious or not. Classifying the software object may comprise classifying the software object as one of a group of maliciousness classes, for example as one of a group of known types of malicious software.

As used herewith, a classification model is a computerized model for predicting a class of input data. For brevity, henceforth the term "classifier" means "classification model" and the terms are used interchangeably. A classifier may be an identified algorithm. A classifier may be a machine learning model trained to predict the class of the input data.

It may be that more than one classifier exists for performing a task of classifying input data as one of one or more known classes. The more than one classifier may differ in properties such as accuracy, speed of classification and amount of computer resources required for classification. One classifier may produce output more accurate than other output produced by another classifier; however the one classifier may require more resources or be slower than the other classifier. For example, for continuous user authentication there may exist a plurality of tests for verifying an identity of a user. Some examples of a test for verifying an identity of a user are a behavior biometric test of mouse movements, solving a puzzle and one or more security question challenges. Some tests may be more difficult for a user to perform than another test, for example solving a puzzle may be more difficult than answering a security question. It may be desirable to reduce interruption of a user's activity and use a difficult test only when an easier test does not provide a certain authentication of the user. In another example, when there are a plurality of medical tests, some tests may be more expensive or more intrusive than other medical tests, for example a blood test may be cheaper than a Computerized Tomography (CT) scan; an X-Ray typically exposes a patient to less radiation than a CT scan.

When there is more than one classifier to perform a task of classifying the input data there is a need to determine which one or more classifiers to use to perform the task according to a required balance between a plurality of considerations such as classification accuracy, speed of classification, and resource costs.

SUMMARY

It is an object of the present invention to provide a system and a method for training thresholds controlling data flow in a plurality of cascaded classifiers.

The foregoing and other objects are achieved by the features of the independent claims. Further implementation forms are apparent from the dependent claims, the description and the figures.

According to a first aspect of the present invention, a method for training thresholds controlling data flow in a plurality of cascaded classifiers for classifying malicious software, comprises in each of a plurality of iterations: computing a set of scores, each for one of a set of threshold sequences, each threshold sequence is a sequence of sets of classifier output thresholds, each set of classifier output thresholds used to control a flow of data from a first cascaded classifier of the plurality of cascaded classifiers, executed by at least one hardware processor, to a second cascaded classifier of the plurality of cascaded classifiers, executed by the at least one hardware processor, each score computed when classifying, using the respective threshold sequence, each of a plurality of software objects as one of a set of maliciousness classes; computing a set of new threshold sequences by applying a genetic algorithm to the set of threshold sequences and the set of scores; and using the set of new threshold sequences in a consecutive iteration of the plurality of iterations; and identifying a preferred threshold sequence, in a plurality of new sets of threshold sequences computed in the plurality of iterations, according to a plurality of sets of scores computed in the plurality of iterations.

According to a second aspect of the present invention, a system for training thresholds controlling data flow in a plurality of cascaded classifiers for classifying malicious software comprises at least one hardware processor adapted to, in each of a plurality of iterations: computing a set of scores, each for one of a set of threshold sequences, each threshold sequence is a sequence of sets of classifier output thresholds, each set of classifier output thresholds used to control a flow of data from a first cascaded classifier of the plurality of cascaded classifiers, executed by the at least one hardware processor, to a second cascaded classifier of the plurality of cascaded classifiers, executed by the at least one hardware processor, each score computed when classifying, using the respective threshold sequence, each of a plurality of software objects as one of an set of maliciousness classes; computing a set of new threshold sequences by applying a genetic algorithm to the set of threshold sequences and the set of scores; and using the set of new threshold sequences in a consecutive iteration of the plurality of iterations; and identifying a preferred threshold sequence, in a plurality of new sets of threshold sequences computed in the plurality of iterations, according to a plurality of sets of scores computed in the plurality of iterations.

According to a third aspect of the present invention, a system for classifying malicious software comprises at least one hardware processor adapted to execute a plurality of cascaded classifiers for classifying malicious software. The at least one hardware processor is adapted to: accessing a threshold sequence, comprising a sequence of sets of classifier output thresholds, each set of classifier output thresholds used to control a flow of data from a first cascaded classifier of the plurality of cascaded classifiers to a second cascaded classifier of the plurality of cascaded classifiers, the threshold sequence trained by applying a genetic algorithm to at least one set of threshold sequences; classifying a software object as one of a set of maliciousness classes by the plurality of cascaded classifiers using the threshold sequence; and outputting the classification of the software object.

With reference to the first and second aspects, in a first possible implementation of the first and second aspects of the present invention computing the set of new threshold sequences by applying a genetic algorithm comprises computing at least one new threshold sequence comprising at least part of each of a plurality of parent threshold sequences of the set of threshold sequences, each selected according to the set of scores. An output classification computed using a new threshold sequence computed using a plurality of parent threshold sequences selected according to the set of scores may be more accurate than an output classification computed using another new threshold sequence computed using a plurality of parent threshold sequences selected at random from the set of threshold sequences. Optionally, computing the at least one new threshold sequence further comprises modifying at least one set of classifier thresholds of the at least one new threshold sequence. Modifying at least one set of classifier thresholds of the new threshold sequence may increase accuracy of an output classification computed using the modified new threshold sequence compared to an output classification computed using the unmodified new threshold sequence. Optionally, the plurality of parent threshold sequences comprises at least two threshold sequences of the set of threshold sequences.

With reference to the first and second aspects, in a second possible implementation of the first and second aspects of the present invention the plurality of cascaded classifiers have an identified cascade order, each set of classifier output thresholds of each of the set of threshold sequences is associated with one of the plurality of cascaded classifiers according to the identified cascade order, and computing the at least one new threshold sequence comprises for each cascaded classifier of the plurality of cascaded classifiers adding to the at least one new threshold sequence a parent set of classifier output thresholds, associated with the cascaded classifier, of a parent threshold sequence of the plurality of parent threshold sequences. Optionally, the plurality of parent threshold sequences comprises two threshold sequences of the set of threshold sequences. Selecting one or more values to add to the new threshold sequence according to a cascaded classifier may be faster than selecting one or more values associated with more than one cascaded classifier, which may facilitate reducing cost of computation of the at least one new threshold sequence, for example when the set of maliciousness classes comprises a small amount of maliciousness classes, such as two.

With reference to the first and second aspects, in a third possible implementation of the first and second aspects of the present invention the plurality of cascaded classifiers have an identified cascade order, each set of classifier output thresholds of each of the set of threshold sequences is associated with one of the plurality of cascaded classifiers according to the identified cascade order, and computing the at least one new threshold sequence comprises for each maliciousness class of the set of maliciousness classes: for each cascaded classifier of the plurality of cascaded classifiers, adding to each new set of classifier output thresholds, associated with the cascaded classifier, of the at least one new threshold sequence, a threshold value associated with the maliciousness class from a parent set of classifier output thresholds, associated with the cascaded classifier, of a parent threshold sequence of the plurality of parent threshold sequences. Selecting one or more values to add to the new threshold sequence according to a maliciousness class may facilitate supporting a set of maliciousness classes having a greater amount of maliciousness classes than when selecting the one or more values according to a cascaded classifier.

With reference to the first and second aspects, or the third implementation of the first and second aspects, in a fourth possible implementation of the first and second aspects of the present invention each threshold sequence of the set of threshold sequences further comprises a classification evaluation order of the set of maliciousness classes, and computing the at least one new threshold sequence further comprises computing at least one new evaluation order comprising at least part of each of a plurality of evaluation orders of the plurality of parent threshold sequences. Optionally, computing the at least one new evaluation order using the plurality of parent threshold sequences comprises in at least one of a plurality of evaluation order iterations: identifying a longest common sequence of unplaced maliciousness classes in a plurality of classification evaluation orders of the plurality of parent thresholds; and placing the longest common sequence of unplaced maliciousness classes in the at least one new evaluation order according to a place of the longest common sequence of unplaced maliciousness classes in at least one of the plurality of classification evaluation orders. Applying the genetic algorithm to compute a preferred evaluation order may increase accuracy of an output classification computed using the preferred evaluation order compared to an output classification computed using a randomly generated evaluation order.

With reference to the first and second aspects, in a fifth possible implementation of the first and second aspects of the present invention computing a score while classifying, using the respective threshold sequence, each of the plurality of software objects as one of the set of maliciousness classes comprises: computing a quality term indicative of an accuracy of classifying the plurality of software objects by the plurality of cascaded classifiers using the respective threshold sequence; computing a speed term indicative of an amount of cascaded classifiers used when classifying the plurality of software objects by the plurality of cascaded classifiers using the respective threshold sequence; and applying an identified weight function to the quality term, the speed term and an identified tradeoff factor, indicative of a tradeoff between classification quality and classification speed, to produce the score. Using a scored computed using an identified tradeoff factor in an identified weight function may allow increasing an output classification while reducing cost of computation of the output classification compared to computing the output classification using a score based only on the quality term or only the speed term.

With reference to the first and second aspects, in a sixth possible implementation of the first and second aspects of the present invention the plurality of iterations comprises an identified amount of iterations.

With reference to the first and second aspects, in a seventh possible implementation of the first and second aspects of the present invention the system further comprises at least one digital communication network interface connected to the at least one hardware processor, and the first cascaded classifier of the plurality of cascaded classifiers sends the data to the second cascaded classifier of the plurality of cascaded classifiers via the at least one digital communication network interface. Using the at least one digital communication network interface for communication between the first cascaded classifier and the second cascaded classifier may facilitate executing the plurality of cascaded classifiers on a distributed system, for example a plurality of hardware processors or a plurality of virtual machines or a combination of a plurality of hardware processors and a plurality of virtual machines, which may reduce cost of implementation of the system. Optionally, the at least one hardware processor is further adapted to output the preferred threshold sequence via the at least one digital communication network interface.

With reference to the first and second aspects, in an eighth possible implementation of the first and second aspects of the present invention the at least one hardware processor is further adapted to store the preferred threshold sequence on at least one non-volatile digital storage connected to the at least one hardware processor.

With reference to the third aspect, in a first possible implementation of the third aspect of the present invention the threshold sequence is trained by applying a genetic algorithm to at least one set of threshold sequences by: in each of a plurality of training iterations: computing a set of scores, each for one of a set of training threshold sequences, each training threshold sequence is a sequence of sets of training classifier output thresholds, each set of training classifier output thresholds used to control a flow of data from a first training cascaded classifier of a plurality of training cascaded classifiers, executed by at least one other hardware processor, to a second training cascaded classifier of the plurality of training cascaded classifiers, executed by the at least one other hardware processor, each score computed when classifying, using the respective training threshold sequence, each of a plurality of training software objects as one of the set of maliciousness classes; computing a set of new training threshold sequences by applying a genetic algorithm to the set of training threshold sequences and the set of scores; and using the set of new training threshold sequences in a consecutive iteration of the plurality of iterations; and identifying a preferred training threshold sequence, in a plurality of new training sets of threshold sequences computed in the plurality of iterations, according to a plurality of sets of scores computed in the plurality of training iterations.

With reference to the third aspect, in a second possible implementation of the third aspect of the present invention the plurality of cascaded classifiers have an identified cascade order; each set of classifier output thresholds of the sequence of sets of classifier output thresholds of the threshold sequence is associated with one of the plurality of cascaded classifiers according to the identified cascade order; and classifying the software object using the threshold sequence comprises: in each of a plurality of classification iterations: computing, using a current classifier of the plurality of cascaded classifiers, at least one new classification in response to an input comprising data characteristic of the software object, each comprising a maliciousness class of the set of maliciousness classes and a confidence value indicative of a level of confidence the software object is of the maliciousness class; and using a current set of classifier output thresholds associated with the current classifier to control the flow of data from the current classifier to a next classifier, consecutive to the current classifier according to the identified cascade order, by: determining an output classification according to a result of comparing a plurality of confidence values of the at least one new classification to the current set of classifier output thresholds; and subject to failure to determine the output classification, using the next classifier, the at least one new classification and the data characteristic of the software object in a consecutive classification iteration of the plurality of classification iterations. Executing a next classifier, consecutive to the current classifier, subject to failure to determine an output classification according to a comparison computed using the current set of classifier output thresholds, may reduce an amount of time required to compute the output classification and in addition may reduce cost of execution of the system for classifying malicious software.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
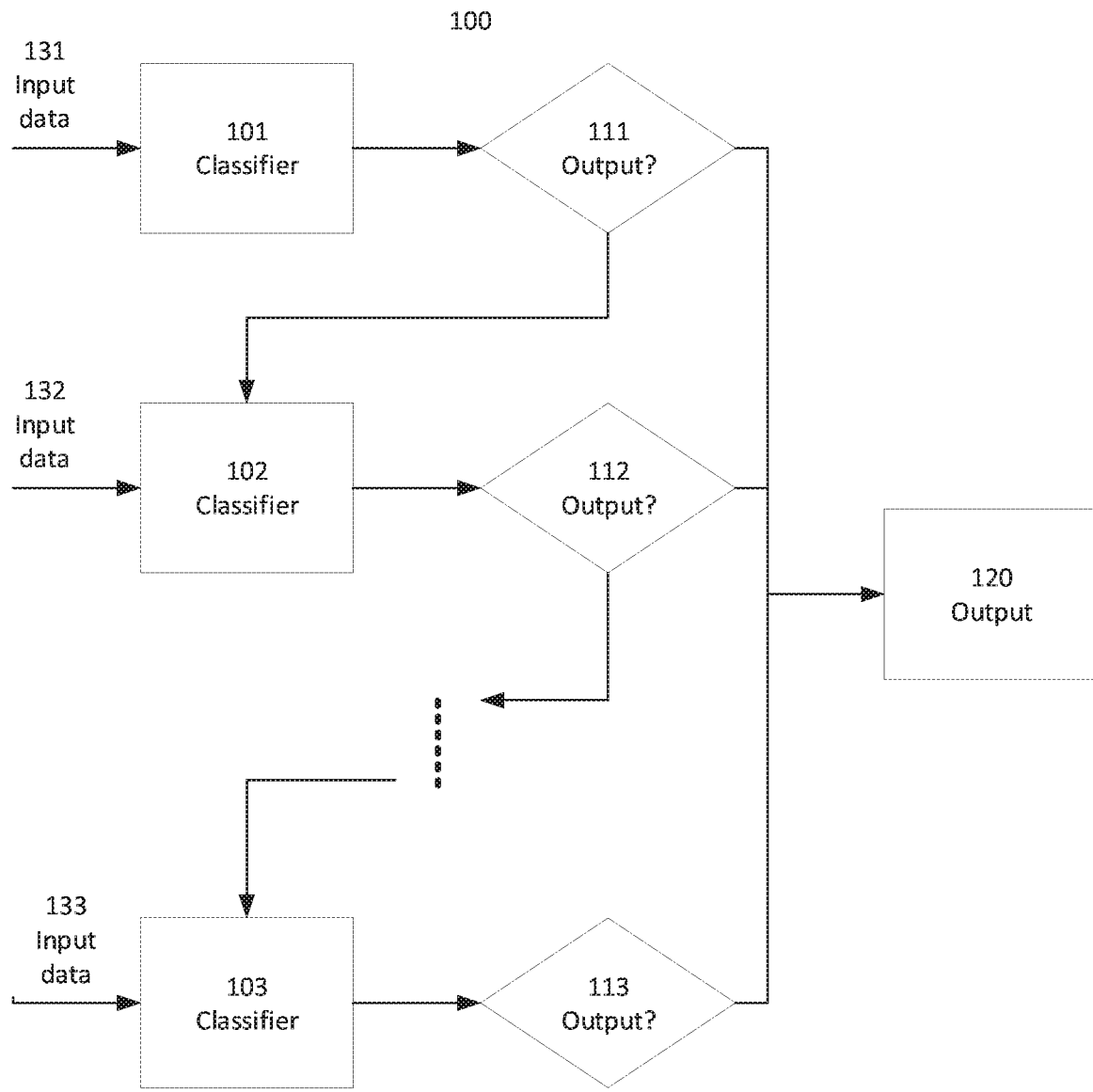
FIG. 1 is a schematic block diagram of a plurality of cascaded classifiers, according to some embodiments of the present invention.

The present invention, in some embodiments thereof, relates to a system and method for classification of findings in input data and, more specifically, but not exclusively, to a system and method for classification of malicious software.

Ensemble classification refers to using multiple classifiers to obtain better predictive performance than could be obtained from any of the constituent classifiers alone. Some existing solutions propose measuring a plurality of performance metrics of each of a plurality of possible classifiers, and selecting a subset of the plurality of classifiers that fit an identified set of constraints applied to the plurality of performance metrics. Some other existing solutions propose using an identified heuristic method to identify a subset of the plurality of possible classifiers which are best suited for an identified task.

Staged ensemble classification (also known as cascaded classification) refers to concatenating a plurality of classifiers in an identified cascade order, and using information collected from an output from a given classifier as additional information for a next classifier in the cascade according to the identified cascade order. Some existing solutions propose using one or more of the plurality classifiers incrementally, in a predefined cascade order, until achieving a satisfying result according to an identified satisfaction test. Currently, such solutions are used for relatively simple problems that require a binary classification (predicting one of two possible classes) and/or require only two stages of classification in the cascade.

The present invention, in some embodiments thereof, proposes using the plurality of classifiers in a cascade comprising the plurality of classifiers arranged in an identified order to classify input data as one of a set of classes, and using a sequence of sets of threshold values to control a flow of data in the cascade of classifiers according to a confidence level of an output of each of the plurality of classifiers. In such embodiments, each of the sequence of sets of threshold values comprises a set of classifier output thresholds used to control a flow of data from a first classifier of the plurality of classifiers to a second classifier of the plurality of classifiers. Optionally, the set of classifier output thresholds comprises a plurality of threshold values, and is used to control the flow of data from the first classifier to the second classifier according to a result of comparing the plurality of threshold values to one or more confidence values of one or more classifications computed by the first classifier. Optionally, controlling the flow of data from the first classifier to the second classifier comprises determining an output classification according to the result of comparing the plurality of threshold values to the one or more confidence values. Using the sequence of sets of threshold values may enable determining an output classification of the cascade of classifiers after executing only some of the plurality of classifiers, which in turn may facilitate reducing an amount of time required to compute the output classification, and additionally or alternatively reducing an amount of resources required to compute the output classification, compared to a system executing all the classifiers of the plurality of classifiers. For example, an information technology (IT) professional, managing a system that provides a service, may have a need to classify a software object prior to installing the software object on the system so as not to compromise the system by installing a malicious software object. Classifying the software object using a classification system implemented according to the present invention to classify the software object as benign or malicious may be faster than classifying the software object using a classification system executing all the classifiers of the plurality of classifiers, which in turn may reduce interruption to the service, when the software object is not malicious, due to the software object not being installed. In addition, an output classification of a system using the plurality of classifiers and the sequence of sets of threshold values may be more accurate than another output classification of another system using some of the plurality of classifiers selected using other heuristic methods. In addition, in some embodiments of the present invention using the sequence of sets of threshold values to control the flow of data in the cascade of classifiers may allow the plurality of classifiers to comprise more than two classifiers, which in turn may increase accuracy of an output classification compared to another output classification computed using no more than two classifiers. In addition, in some other embodiments of the present invention, using the sequence of sets of threshold values to control the flow of data in the cascade of classifiers may allow the set of classes to comprise more than two classes, which in turn may increase accuracy of an output classification compared to another output classification selected from a set comprising no more than two classes.

The term "genetic algorithm" refers to an algorithm inspired by the process of natural selection of Darwin's theory of evolution. A genetic algorithm relies on biology-inspired operators of selection, crossover (also called recombination) and mutation applied to an identified population of objects. In some genetic algorithms each of the population of objects comprises a plurality of elementary building blocks, and in each of a plurality of iterations, known as generations, each of a new population of objects is created from elementary building blocks of two or more parent objects of an existing population of objects. Such creation of a new object is known as crossover, or recombination. In some genetic algorithms the two or more parent objects are selected from a set of fittest objects, identified in the existing population of objects according to a score computed for each of the existing population of objects, where the score reflects a relevance of the respective object to a problem space of the algorithm. In some genetic algorithms, after recombination, some of the elementary building blocks of the new object are modified, an operation known as a mutation. In some genetic algorithms, creation of a new population of objects is repeated until a termination condition has been reached. Some possible termination conditions are: an identified amount of generations has been created, an object's score satisfies a predefined condition, and scores of all objects of a new population of objects are not improved compared to scores of objects of one or more previous populations of objects.

In some embodiments of the present invention, the sequence of sets of threshold values is trained using a genetic algorithm to search for a preferred sequence of sets of threshold values in a population of possible sequences of sets of thresholds. In such embodiments, in each of a plurality of training iterations, each of an existing set of sequences of sets of threshold values is used when the plurality of classifiers computes each of a plurality of classifications. An example of the plurality of classifiers computing each of a plurality of classifications is when the plurality of classifiers computes a classification of each of a plurality of software objects as one of a set of maliciousness classes. Another example of the plurality of classifiers computing each of a plurality of classifications is when the plurality of classifiers computes a classification of each of a plurality of sets of medical test results as one of a set of medical conditions. Optionally, a score is computed for each of the existing set of sequences of sets of threshold values, indicative of a tradeoff between a plurality of performance metrics of computing the plurality of classifications by the plurality of classifiers using the respective existing sequence of sets of threshold values, producing a set of scores. Some examples of a performance metric are computation speed, computation accuracy and an amount of resources. Optionally, in each of the plurality of training iterations, a new set of sequences of sets of threshold values is computed by applying a genetic algorithm to the existing set of threshold sequences and the set of scores. In some embodiments of the present invention, the elementary building blocks are groups of threshold values. And each of the new set of sequences of sets of threshold values is computed by combining some threshold values of each of a plurality of parent threshold sequences selected from the existing set of threshold sequences. Optionally, a preferred sequence of sets of threshold values is identified in a plurality of new sets of sequences of sets of threshold values according to respective score. Using a genetic algorithm to produce the plurality of new sets of sequences of sets of threshold values may increase accuracy of an output classification of the plurality of classifiers and additionally or alternatively reduce an amount of classifiers executed to compute the output classification, thus facilitating reducing an amount of time required to compute the output classification, and additionally or alternatively reducing an amount of resources required to compute the output classification, compared to a system using a plurality of sequences of sets of threshold values identified using a non-genetic algorithm.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following is a non-limiting description focusing on using the present invention for classification of malicious software, i.e. predicting a maliciousness class in response to input describing a software object. However, the present invention may be used to predict another type of class in response to another type of input data, for example predicting a medical diagnosis class in response to input data comprising medical test results, or predicting an authentication level in response to input comprising one or more user challenge results.

Reference is now made to FIG. 1, showing is a schematic block diagram of a plurality of cascaded classifiers, according to some embodiments of the present invention. In such embodiments a plurality of cascaded classifiers 100 comprises classifier 101, classifier 102 and last classifier 103. Optionally, the plurality of cascaded classifiers is arranged in an identified cascade order. Optionally, one of the plurality of cascaded classifiers, for example classifier 103, is a last classifier. Classifier 1 optionally receives input data 131. For example, input data 131 may comprise data characteristic of a software object. Optionally, the data characteristic of the software object is collected when executing the software object by at least one executing computer system or device. Classifier 101 optionally computes one or more classifications in response to input data 131. Optionally, each of the one or more classifications comprises a maliciousness class of a set of maliciousness classes and a confidence value indicative of a level of confidence the software object is of the maliciousness class. A maliciousness class may be a type of malicious software, for example an identified computer virus or family of computer viruses. Optionally, a system implementing plurality of cascaded classifiers 100 has a threshold sequence comprising a sequence of sets of classifier output thresholds, each associated with one of the plurality of cascaded classifiers according to the identified cascade order. Each set of classifier output thresholds of the threshold sequence optionally comprises a plurality of classifier threshold values, each associated with one of the set of maliciousness classes. Optionally, a system implementing plurality of cascaded classifiers 100 uses the threshold sequence to control a flow of data from one cascaded classifier of plurality of cascaded classifiers 100 and another cascaded classifier of plurality of cascaded classifiers 100. Optionally, decision module 111 compares one or more confidence values of the one or more classifications to the plurality of classifier threshold values of the set of classifier output thresholds associated with classifier 101, and according to a result of the comparison optionally determines an output classification and sends the output classification to output module 120. Subject to failure to determine the output classification, decision module 111 optionally instructs a consecutive classifier according to the identified cascade order, for example classifier 102, to receive input data 132 and compute one or more new classifications in response to input data 132. Optionally, input data 131 comprises at least part of input data 131. Optionally, input data 132 comprises at least part of the one or more classifications computed by classifier 101. Similarly decision module 112 optionally compares one or more new confidence values of the one or more new classifications to a new plurality of classifier threshold values of a new set of classifier output thresholds associated with classifier 102, and according to a new result of the comparison optionally determines a new output classification and sends the new output classification to output module 120. Classifying input data and using a decision module to conditionally instruct a consecutive classifier in the plurality of cascaded classifiers, according to the identified cascade order, to compute one or more new classifications, may be repeated until output module 120 receives an output classification. Optionally, last classifier 103 receives input data 133 and computes one or more last classifications in response to input data 133. Optionally, decision module 113 compares one or more last confidence values of the one or more last classifications to a last plurality of classifier threshold values of a last set of classifier output thresholds associated with classifier 103, and according to a last result of the comparison optionally determines a last output classification and sends the last output classification to output module 120.

When the set of maliciousness classes comprises two identified classes, a system executing plurality of cascaded classifiers 100 may use the following non-mandatory threshold sequence.

Figure 2:
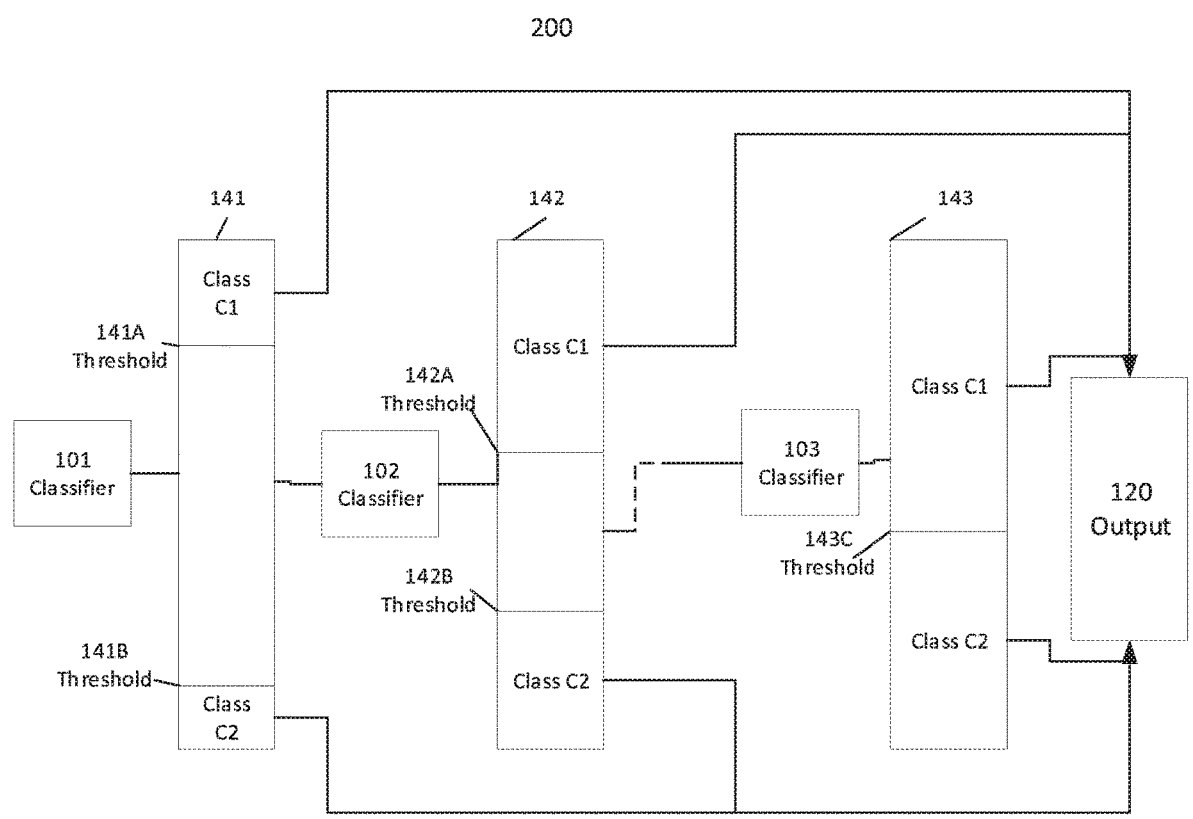
FIG. 2 is a schematic block diagram of a threshold sequence for binary classification, according to some embodiments of the present invention.

Reference is now made also to FIG. 2, showing a schematic block diagram of an exemplary threshold sequence 200 for binary classification, according to some embodiments of the present invention. In such embodiments, threshold sequence 200 comprises a first set of classifier output thresholds 141 comprising threshold values 141A and 141B, a second set of classifier output thresholds 142 comprising threshold values 142A and 142B and a last set of classifier output threshold values 143 comprising one threshold value 143C. Optionally, the set of maliciousness classes comprises two identified classes: class C1 and class C2. Optionally, classifier 101 outputs a first classification comprising a first confidence value indicative of a confidence level that input data 131 is of class C1 and in addition indicative of a confidence level that input data 131 is of class C2. Optionally, decision module 111 compares the first confidence value to the plurality of classifier output threshold values of set 141. When the first confidence value is less than classifier output threshold value 141A, decision module 111 optionally outputs an output classification of class C1. When the first confidence value is greater than classifier output threshold value 141B, decision module 111 optionally outputs an output classification of class C2. Failing to determine an output classification, decision module 111 optionally instructs classifier 102 to compute a new classification. Optionally, decision module 112 compares a new confidence value of the new classification to the new plurality of classifier output threshold values of set 142. When the new confidence value is less than classifier output threshold value 142A, decision module 112 optionally outputs a new output classification of class C1. When the new confidence value is greater than classifier output threshold value 142B, decision module 112 optionally outputs a new output classification of class C2. Failing to determine a new output classification, decision module 111 optionally instructs a consecutive classifier according to the identified cascade order to compute another new classification.

Optionally, last decision module 113 compares a last confidence value of a last classification computed by last classifier 103 to a last output threshold value 143C of set 143. When the last confidence value is less than classifier output threshold value 143C, decision module 113 optionally outputs a last output classification of class C1, otherwise decision module 113 optionally outputs a last output classification of class C2.

In some embodiments of the present invention the set of maliciousness classes comprises more than two identified maliciousness classes. An amount of maliciousness classes in the set of maliciousness classes may be denoted by n, and the more than two identified maliciousness classes may be denoted by $C_1, C_2, \ldots, C_n$. An amount of cascaded classifiers in the plurality of cascaded classifiers may be denoted by m, and the plurality of cascaded classifiers may be denoted by $Classifier_1, Classifier_2, \ldots, Classifier_m$. In such embodiments, a classifier denoted by $Classifier_j$ optionally computes an n-length vector of confidence values, each confidence value denoted by $p_{i,j}$ indicative of a confidence level of $Classifier_j$ that input data input into $Classifier_j$ belongs to class $C_i$. Optionally, the plurality of confidence values of the n-length vector are normalized as probabilities, such that each $0 \leq p_{i,j} \leq 1$, and for each classifier denoted by $Classifier_j \Sigma_{i=1}^{n} p_{i,j} = 1$.

In such embodiments, a set of classifier output threshold values associated with a classifier denoted by $Classifier_j$ may be denoted by [val-$c_j$1, val-$c_j$2, ..., val-$c_j$n]. Optionally, each classifier output threshold value is indicative of a minimal confidence score for respective maliciousness class. Optionally, a decision module executed after executing $Classifier_j$ compares each confidence value denoted by $p_{i,j}$ and associated with maliciousness class $C_i$ to respective classifier output threshold value val-$c_j$i. The decision module executed after executing $Classifier_j$ optionally determines an output classification according to a plurality of results of comparing each confidence value to respective classifier output threshold value. In one example, when only one confidence value denoted by $p_{i,j}$ exceeds the respective classifier output threshold value val-$c_j$i the decision output module may determine an output classification of class $C_i$. In addition, when no confidence value of the n-length vector exceeds respective classifier output threshold value of the set of classifier output threshold values associated with $Classifier_j$, the decision module may fail to determine an output classification and may instruct a consecutive classifier $Classifier_{j+1}$ to compute a new n-length vector of confidence values. Optionally, when more than one confidence value of the n-length vector exceeds respective classifier output threshold value of the set of classifier output threshold values associated with $Classifier_j$, the decision module may use a predefined arbitration policy to determine an output classification. One example of an arbitration policy comprises identifying a highest confidence level in the plurality of confidence levels. Another example of an arbitration policy comprises computing a plurality of margins between a confidence level of the plurality of confidence levels and respective classifier output threshold value of the set of classifier output threshold values associated with $Classifier_j$, and identifying a greatest positive margin in the plurality of margins. Yet another example of an arbitration policy comprises the observing the plurality of confidence levels in an identified evaluation order of the plurality of maliciousness classes.

Optionally, the threshold sequence comprises the identified evaluation order of the plurality of maliciousness classes. For example, when three confidence levels denoted by $p_{a,j}$, $p_{b,j}$, and $p_{c,j}$ each exceeds respective classifier output threshold value, and the threshold sequence comprises an identified evaluation order of $C_b$, $C_a$, $C_c$ the decision module may observer the three confidence levels in the identified evaluation order and determine an output classification of $C_b$.

According to some embodiments of the present invention, the threshold sequence used by a system executing plurality of cascaded classifiers 100 may be trained using a genetic algorithm.

Figure 3:
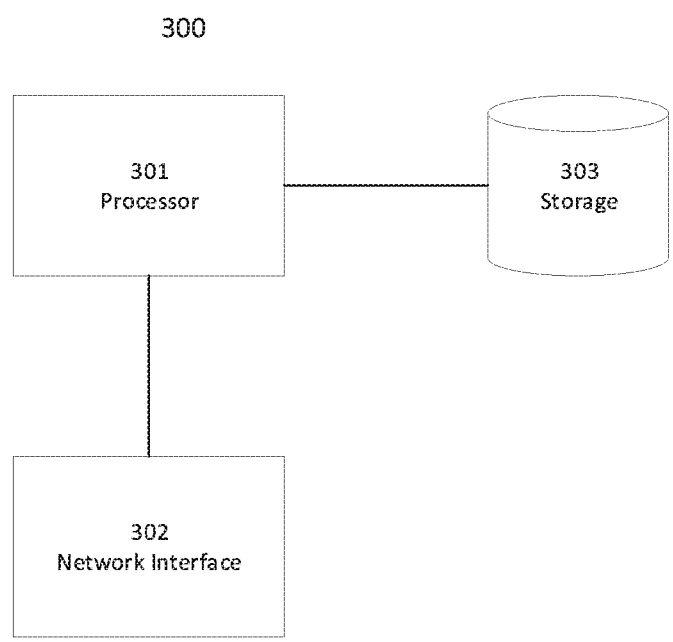
FIG. 3 is a schematic block diagram of an exemplary system for training a threshold sequence, according to some embodiments of the present invention.

Reference is now made also to FIG. 3, showing a schematic block diagram of an exemplary system 300 for training a threshold sequence, according to some embodiments of the present invention. In such embodiments, at least one hardware processor 301 is connected to at least one digital communication network interface 302, optionally for the purpose of receiving input data describing each of a plurality of software objects. For brevity, the term "processor" is used to mean "at least one hardware processor". Optionally, processor 301 executes plurality of cascaded classifiers 100. At least one digital communication network interface 302 is optionally connected to a Local Area Network (LAN), such as an Ethernet network or a wireless network. Optionally, at least one digital communication network interface 302 is connected to a Wide Area Network (WAN), such as the Internet. Optionally, classifier 101 communicates with classifier 102 using at least one digital communication network interface 302. Optionally, processor 301 is connected to at least one non-volatile digital storage 303, optionally for the purpose of storing a preferred threshold sequence trained by system 300. Some examples of a non-volatile digital storage are a hard disk drive, network storage and a network connected storage. Optionally, processor 301 outputs the preferred threshold sequence via at least one digital communication network interface 302.

In some embodiments of the present invention, to train a threshold sequence system 300 implements the following optional method.

Figure 4:
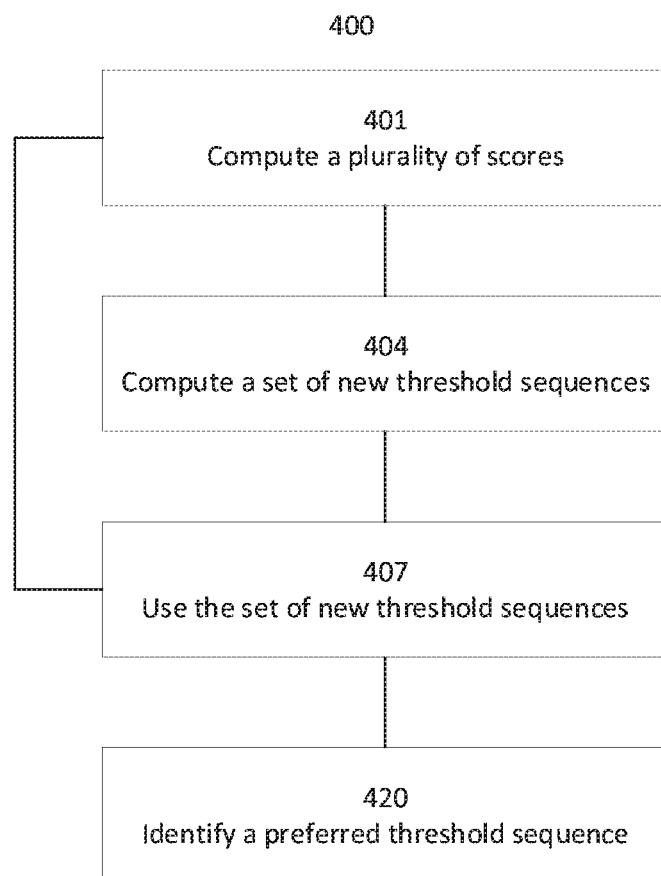
FIG. 4 is a flowchart schematically representing an optional flow of operations for training a threshold sequence, according to some embodiments of the present invention.

Reference is now made also to FIG. 4, showing a flowchart schematically representing an optional flow of operations 400 for training a threshold sequence, according to some embodiments of the present invention. In such embodiments, in each of a plurality of iterations processor 301 produces one or more new threshold sequences from a set of threshold sequences. Each threshold sequence is optionally a sequence of sets of classifier output thresholds. Each set of classifier output thresholds is optionally used by processor 301 to control a flow of data from a first cascaded classifier of plurality of cascaded classifiers 100 to a second cascaded classifier of plurality of cascaded classifiers 100 for example by decision module 111, decision module 112 and decision module 113.

In each of the plurality of iterations processor 301 optionally computes in 401 a set of scores. Each of the set of scores is optionally for one of the set of threshold sequences and is optionally computed when classifying each of a plurality of input data sets as one of a set of classes, for example when classifying each of a plurality of software objects as one of a set of maliciousness classes. Optionally, the input data comprises a plurality of labels, each associated with one of the plurality of software objects indicative of a maliciousness class from the set of maliciousness classes of the respective software object. Optionally, each score is computed when processor 301 classifies each of the plurality of software objects by executing plurality of cascaded classifiers 100 using the respective set of threshold sequences, optionally in response to input data describing each of software objects.

Figure 5:
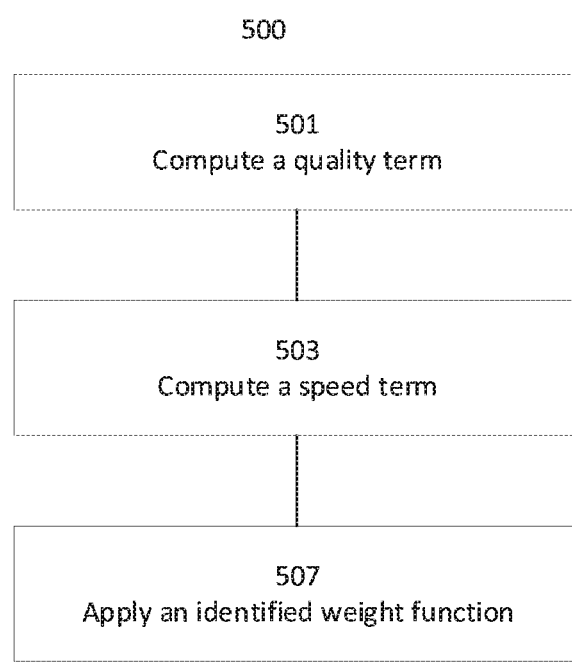
FIG. 5 is a flowchart schematically representing an optional flow of operations for computing a threshold sequence score, according to some embodiments of the present invention.

Reference is now made also to FIG. 5, showing a flowchart schematically representing an optional flow of operations 500 for computing a threshold sequence score, according to some embodiments of the present invention. In such embodiments, to compute a score for a threshold sequence of the set of threshold sequences while classifying, using the threshold sequence, each of the plurality of software objects as one of the set of maliciousness classes, processor 301 computes in 501 a quality term indicative of an accuracy of classifying the plurality of software objects by plurality of cascaded classifiers 100 using the threshold sequence. A false classification rate of an identified maliciousness class is a ratio between an amount of false classifications of some of the plurality of software objects as the identified maliciousness class and an amount of software objects of the plurality of software objects belonging to the identified maliciousness class.

When the set of maliciousness classes comprises two maliciousness classes, processor 301 may compute the quality term by computing an average of a first false classification rate of a first of the two maliciousness classes and a second false classification rate of a second of the two maliciousness classes. This is equivalent to an average of a false discovery rate and a false omission rate when the first of the two maliciousness classes is considered the positive and the second of the two maliciousness classes is considered the negative. When the set of maliciousness classes comprises more than two maliciousness classes, processor 301 may compute the quality term by computing at least one metric of a group of possible metrics comprising: an average F1 score, a weighted average F1 score, an average Matthews Correlation Coefficient (MCC), and a weighted average MCC. Optionally, processor 301 computes a plurality of metrics, one for each of the set of maliciousness classes, and computes an average or a weighted average of the plurality of metrics.

In 503, processor 301 optionally computes a speed term indicative of an amount of cascaded classifiers used when classifying the plurality of software objects by plurality of cascaded classifiers 100 using the threshold sequence. An example of a speed term indicative of an amount of cascaded classifiers is an average amount of classifiers used when classifying the plurality of software objects, normalized between 0 and 1. In 507, processor 301 optionally applies an identified weight function to the quality term, the speed term and an identified tradeoff factor indicative of a tradeoff between classification quality and classification speed, to produce the score of the threshold sequence. Optionally, the identified tradeoff factor is a value, denoted by $\alpha$, where $\alpha$ is between 0 and 1. Optionally, the identified weight function is computed according to the following equation:

$$score = 1 - \alpha * QT - (1-\alpha) * ST$$

where QT denotes the quality term and ST denotes the speed term.

Reference is now made again to FIG. 4. In 404, processor 301 optionally computes a set of new threshold sequences by applying a genetic algorithm to the set of threshold sequences and the set of scores. Optionally, applying the genetic algorithm to the set of threshold sequences and the set of scores comprising applying one or more biology-inspired operations to the set of threshold sequences. The one or more biology-inspired operations may be selected from a group of biology-inspired operations comprising selection of one or more parent threshold sequences from the set of threshold sequences, crossover of a plurality of elementary building blocks of the one or more parent threshold sequences, and mutation of one or more of the plurality of elementary building blocks Optionally, computing the set of new threshold sequences by applying the genetic algorithm comprises selecting a plurality of parent threshold sequences of the set of threshold sequences. Optionally, the plurality of parent threshold sequences is selected according to the set of scores. Optionally, the plurality of parent threshold sequences comprises at least two threshold sequences of the set of threshold sequences. Optionally, the plurality of parent threshold sequences are selected randomly such that a probability of selecting an identified threshold sequence of the plurality of threshold sequences reflects a ratio between the identified threshold sequence's score and the set of scores. Optionally a first threshold sequence having a first score higher than a second score of a second threshold sequence has a first probability of being selected as a parent threshold sequence higher than a second probability of selecting the second threshold sequence as a parent threshold sequence. Optionally, the plurality of parent threshold sequences are selected from an identified set of fit threshold sequences of the set of threshold sequences having highest scores in the set of scores.

Optionally, computing the set of new threshold sequences by applying the genetic algorithm comprises computing a crossover of a plurality of elementary building blocks of the plurality of parent threshold sequences, i.e. computing at least one new threshold sequence comprising at least part of each of the plurality of parent threshold sequences of the set of threshold sequences. Optionally, computing the at least one new threshold sequence comprises modifying at least one set of classifier thresholds of the at least one new threshold sequence. Optionally, the at least one set of classifier thresholds of the at least one new threshold sequence is modified randomly such that a probability of modifying the at least one set of classifier thresholds is an identified threshold mutation probability, for example 0.5% or 7%. Optionally, modifying the at least one set of classifier thresholds of the at least one new threshold sequence comprises modifying one or more threshold values of the at least one set of classifier thresholds of the at least one new threshold sequence. Optionally, the one or more threshold values are increased or decreased by a mutation value. An example of a mutation value is a value between 0.01 and 0.1.

Figure 6:
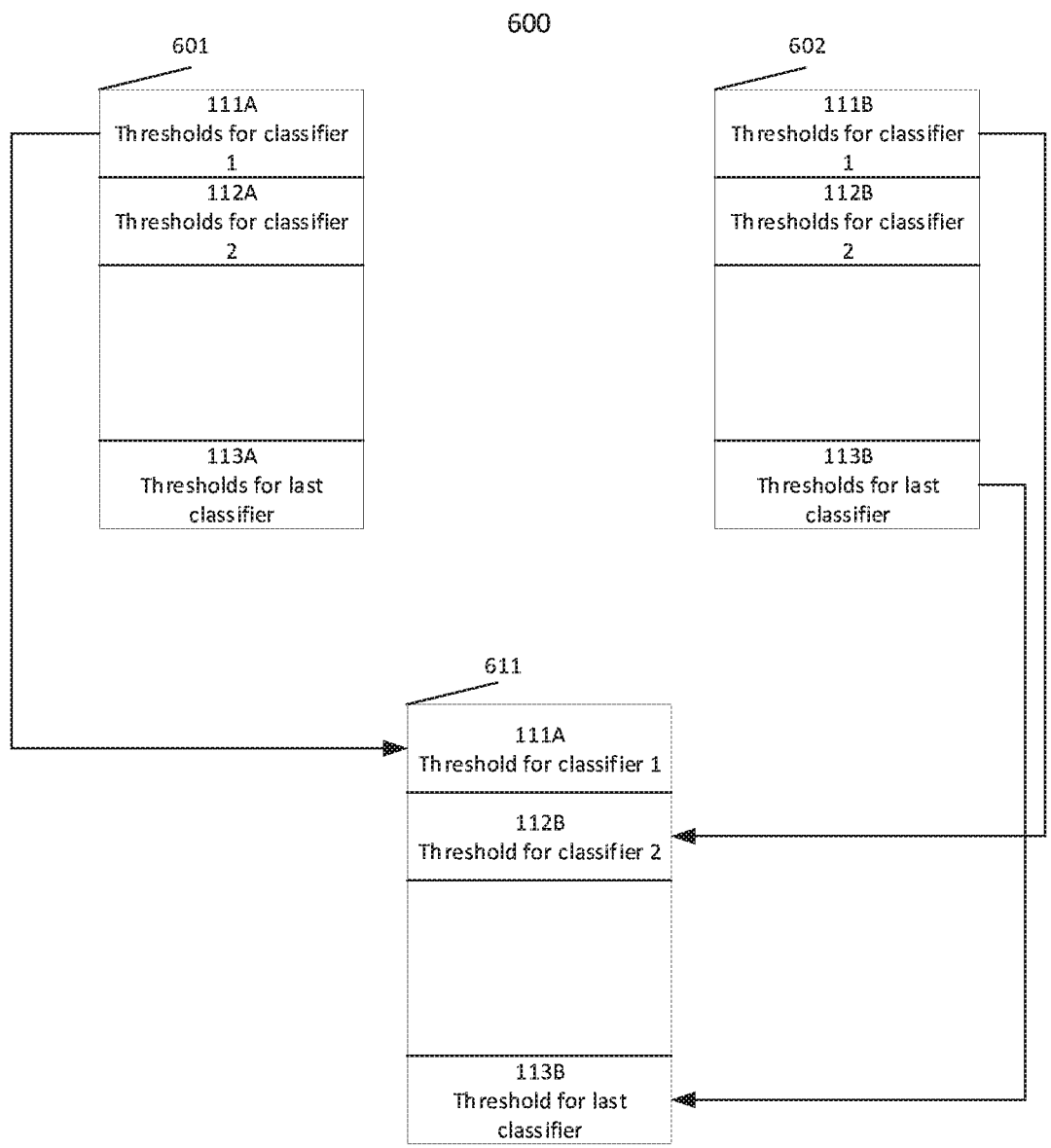
FIG. 6 is a schematic illustration of an exemplary genetic crossover, according to some embodiments of the present invention.

Reference is now made also to FIG. 6, showing a schematic illustration of an exemplary genetic crossover 600, according to some embodiments of the present invention. In such embodiments, each set of classifier output thresholds of a threshold sequence of the set of threshold sequences is an elementary building block of the threshold sequence. Optionally, in 404 processor 301 computes at least one new threshold sequence 611 from a plurality of parent threshold sequences by selecting from each of the plurality of parent threshold sequences at least some elementary building blocks according to each of the plurality of cascaded classifiers, i.e. by selecting from each of the plurality of parent threshold sequences at least some of the parent threshold sequences sets of classifier output thresholds. Optionally, the plurality of threshold sequences comprises first parent threshold sequence 601 and second parent threshold sequence 602. Optionally, each set of classifier output thresholds of each of the set of threshold sequences is associated with one of the plurality of cascaded classifiers according to the identified cascade order. For example, in first parent threshold sequence 601 set of classifier output thresholds 111A is associated with classifier 101, set of classifier output thresholds 112A is associated with classifier 102 and set of classifier output thresholds 113A is associated with classifier 103. Similarly, in second parent threshold sequence 602 set of classifier output thresholds 111B is associated with classifier 101, set of classifier output thresholds 112B is associated with classifier 102 and set of classifier output thresholds 113B is associated with classifier 103. Optionally, processor 301 computes in 404 at least one new threshold sequence 611 by adding to at least one new threshold sequence 611 for each of the plurality of cascaded classifiers a parent set of classifier output thresholds, associated with the cascaded classifier, of a parent threshold sequence of the plurality of parent threshold sequences. For example, processor 301 optionally adds to at least one new threshold sequence 611 from first parent threshold sequence 301 set of classifier output thresholds 111A associated with classifier 101. Optionally, processor adds to at least one new threshold sequence 611 from second parent threshold sequence 602 set of classifier output thresholds 112B associated with classifier 102 and set of classifier output thresholds 113B associated with classifier 103. Optionally, processor 301 adds to at least one new threshold sequence 611 for each of the plurality of cascaded classifiers a parent set of classifier output thresholds, associated with the cascaded classifier, of a parent threshold sequence of the plurality of parent threshold sequences when the plurality of parent threshold sequences comprises two threshold sequences of the set of threshold sequences. Optionally, processor 301 adds to at least one new threshold sequence 611 for each of the plurality of cascaded classifiers a parent set of classifier output thresholds, associated with the cascaded classifier, of a parent threshold sequence of the plurality of parent threshold sequences when the set of maliciousness scores comprises two maliciousness scores.

Figure 7:
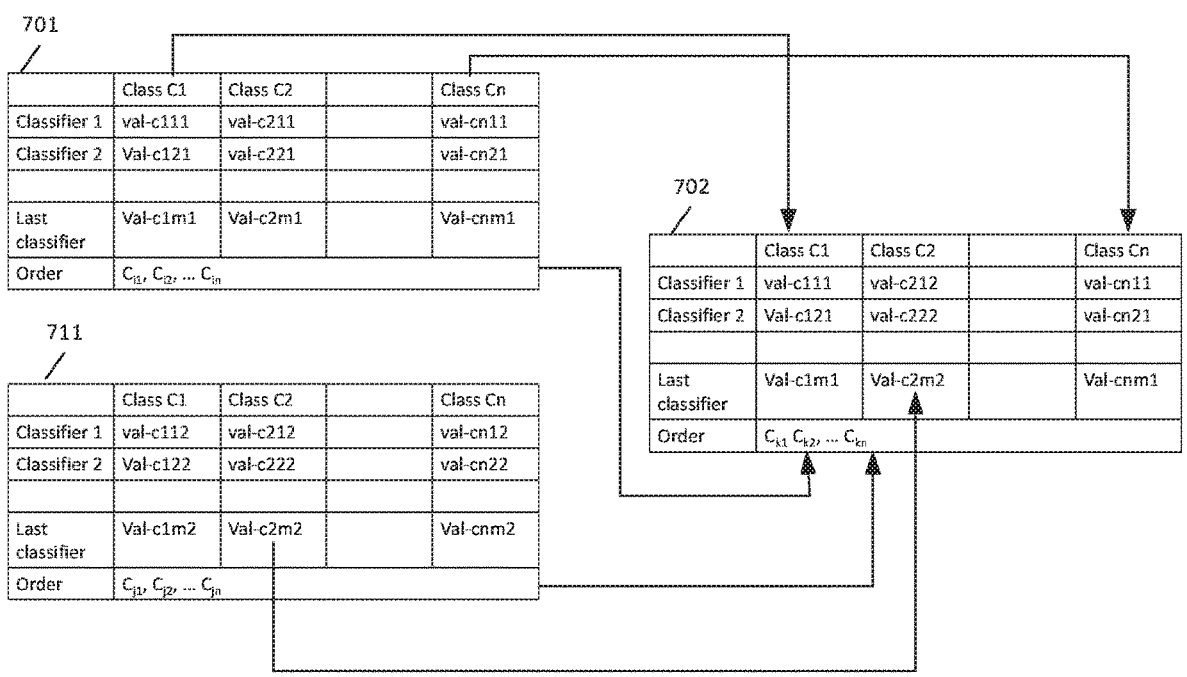
FIG. 7 is a schematic illustration of another exemplary genetic crossover, according to some embodiments of the present invention.

Reference is now made also to FIG. 7, showing a schematic illustration of another exemplary genetic crossover 700, according to some embodiments of the present invention. In such embodiments, an elementary building block of a threshold sequence of the set of threshold sequences is a sequence of class threshold values of the plurality of sets of classifier output thresholds where each of the sequence of class threshold values is associated with an identified maliciousness class of the set of maliciousness classes. In addition, each of the sequence of class threshold values is optionally associated with one of the plurality of cascaded classifiers. Optionally, in 404 processor 301 computes at least one new threshold sequence 711 from the plurality of parent threshold sequences by selecting from each of the plurality of parent threshold sequences at least some elementary building blocks according to each of the set of maliciousness classifications, i.e. by selecting from each of the plurality of parent threshold sequences at least some sequences of class threshold values. Optionally, the plurality of threshold sequences comprises first parent threshold sequence 701 and second parent threshold sequence 702. Optionally, each set of classifier output thresholds of each of the set of threshold sequences is associated with one of the plurality of cascaded classifiers according to the identified cascade order. Optionally, for each maliciousness class of the set of maliciousness classes, processor 301 adds to each new set of classifier output thresholds, associated with an identified cascade classifier of the plurality of cascaded classifiers, of at least one new threshold sequence 711, a threshold value associated with the maliciousness class from a parent set of classifier output thresholds, associated with the identified cascaded classifier, of one of the plurality of parent threshold sequences.

Optionally, each threshold sequence of the set of threshold sequences further comprises a classification evaluation order of the set of maliciousness classes. Optionally, processor 301 uses the classification evaluation order when determining an output classification, for example when executing decision module 111, decision module 112 and decision module 113. Optionally, computing the at least one new threshold sequence further comprises computing at least one new evaluation order comprising at least part of each of a plurality of evaluation orders of the plurality of parent threshold sequences. Optionally, computing the at least one new evaluation order using the plurality of parent threshold sequences comprises in at least one of a plurality of evaluation order iterations identifying a longest common sequence of unplaced maliciousness classes in a plurality of classification evaluation orders of the plurality of parent thresholds, and optionally placing the longest common sequence of unplaced maliciousness classes in the at least one new evaluation order according to a place of the longest common sequence of unplaced maliciousness classes in at least one of the plurality of classification evaluation orders. Optionally, the at least one new evaluation order is modified, for example by exchanges two adjacent classifiers in the at least one new evaluation order. Optionally, the at least one new evaluation order is modified randomly such that a probability of modifying the at least one new evaluation order is an identified evaluation order mutation probability, for example 0.5% or 7%.

Reference is now made again to FIG. 4. In 407, processor 301 optionally uses the set of new threshold sequences in a consecutive iteration of the plurality of iterations. Optionally, processor 301 repeats 401, 404 and 407 in the plurality of iterations until a termination condition has been reached. For example, the plurality of iterations optionally comprises an identified amount of iterations. Optionally, processor 301 repeats 401, 404 and 407 until at least one score of at least one of the set of threshold sequences exceeds an identified target threshold score. Optionally, processor 301 repeats 401, 404 and 407 until the new set of threshold sequences is no better than an identified amount of previously generated new sets of threshold sequences, for example when a maximum score of a set of scores computed for the new set of threshold sequences is no greater than one or more other maximum scores of other sets of scores computed for one or more previously generated new sets of threshold sequences.

In 420, processor 301 optionally identifies a preferred threshold sequence in a plurality of new sets of threshold sequences computed in the plurality of iterations. Optionally, the processor 301 identifies the preferred threshold sequence according to a plurality of sets of scores computed in the plurality of iterations. For example, processor 301 may identify the preferred threshold sequence according to a maximum score computed in the plurality of iterations.

To classify input data, for example input data describing a software object, as one of a set of classes, for example the set of maliciousness classes, some embodiments of the present invention implement the following optional system.

Figure 8:
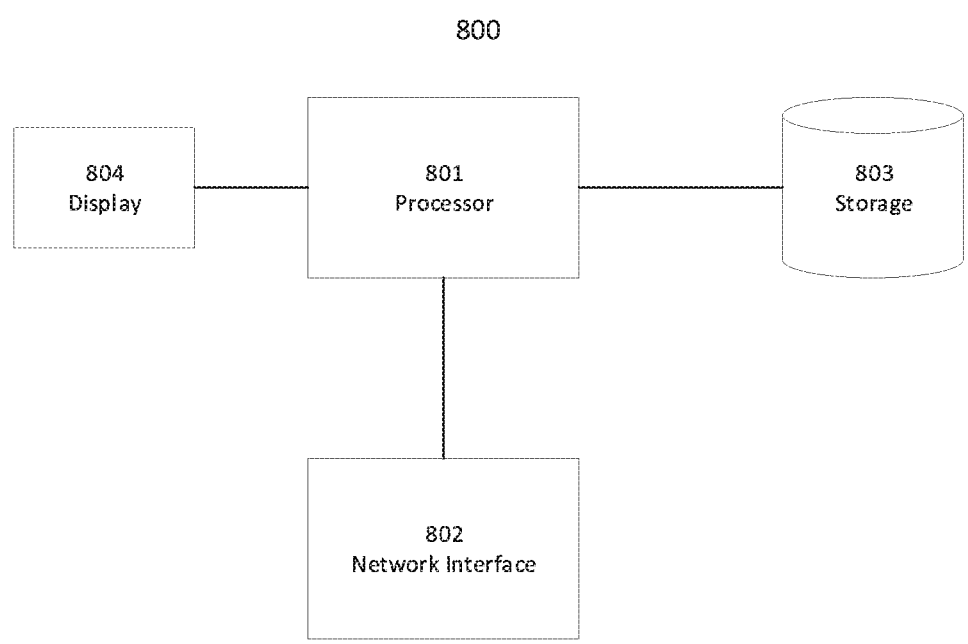
FIG. 8 is a schematic block diagram of an exemplary classification system, according to some embodiments of the present invention.

Reference is now made to FIG. 8, showing a schematic block diagram of an exemplary classification system 800, according to some embodiments of the present invention. In such embodiments, processor 801 is connected to at least one digital communication network interface 802, optionally for the purpose of receiving input data describing a software object. Optionally, processor 801 executes plurality of cascaded classifiers 100. Optionally, at least one digital communication network interface 802 is connected to a Local Area Network (LAN), such as an Ethernet network or a wireless network. Optionally, at least one digital communication network interface 802 is connected to a Wide Area Network (WAN), such as the Internet. Optionally, at least one of plurality of cascaded classifiers 100 communications with at least one other of plurality of cascaded classifiers 100 via at least one digital communication network interface 802. Optionally, processor 801 is connected to at least one display device 804, optionally for the purpose of outputting a classification of the software object. Some examples of a display device are a computer screen, a monitor and a screen of a hand-held device. Optionally, processor 801 is connected to at least one non-volatile digital storage 803, optionally for the purpose of outputting the classification of the software object. Optionally, processor 801 receives the input data from at least one non-volatile digital storage 803.

To classify the input data as one of a set of classes, in some embodiments of the present invention system 800 implements the following optional method.

Figure 9:
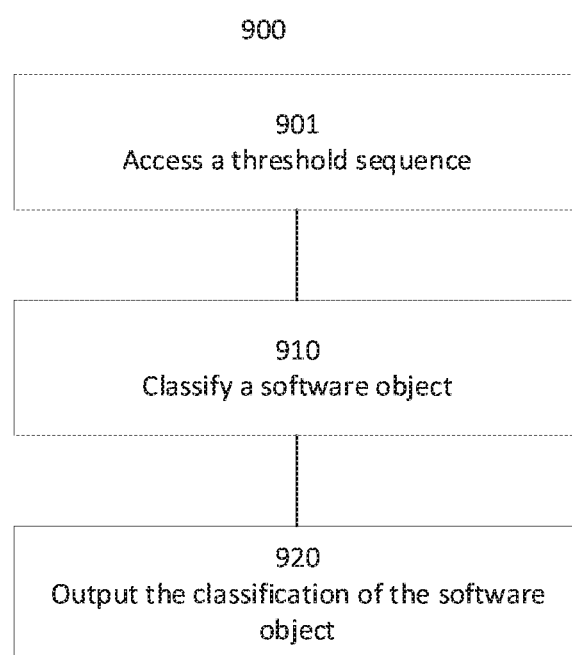
FIG. 9 is a flowchart schematically representing an optional flow of operations for classifying input data, according to some embodiments of the present invention.

Reference is now made also to FIG. 9, showing a flowchart schematically representing an optional flow of operations 900 for classifying input data, according to some embodiments of the present invention. In such embodiments, in 901 processor 801 accesses a threshold sequence, comprising a sequence of sets of classifier output thresholds.

Optionally each set of classifier output thresholds is used to control a flow of data from a first classifier of plurality of cascaded classifiers 100 to a second classifier of plurality of cascaded classifiers 100. Optionally, the threshold sequence was trained by system 300, optionally implementing method 400. In 910, processor 801 optionally classifies a software object as one of a set of maliciousness classes by plurality of cascaded classifiers 100, using the threshold sequence. Optionally, plurality of cascaded classifiers 100 have an identified cascade order. Optionally, each set of classifier output thresholds of the sequence of sets of classifier output thresholds of the threshold sequence is associated with one of plurality of cascades classifiers 100 according to the identified cascade order.

Figure 10:
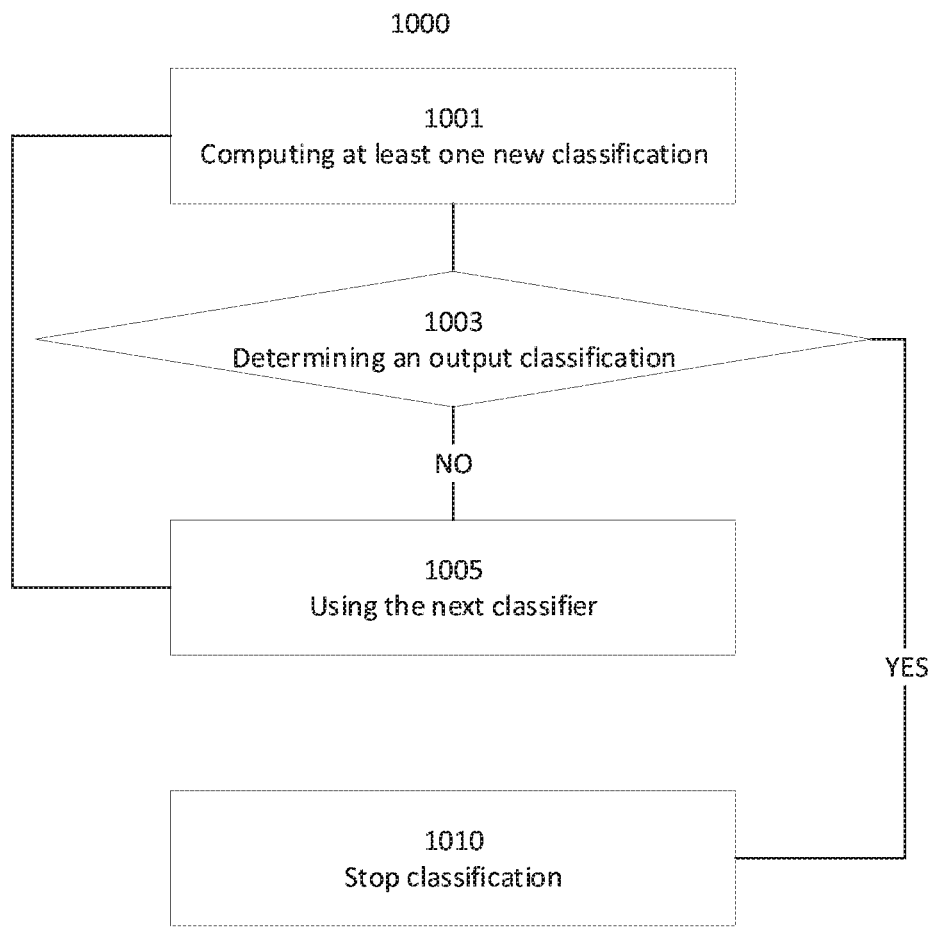
FIG. 10 is a flowchart schematically representing an optional flow of operations for executing a plurality of cascaded classifiers, according to some embodiments of the present invention.

Reference is now made also to FIG. 10, showing a flowchart schematically representing an optional flow of operations 1000 for executing a cascaded classifier, according to some embodiments of the present invention. In 1001, processor 801 optionally computes at least one new classification in response to an input comprising data characteristic of the software object. Optionally each of the at least one new classification comprises a maliciousness class of the set of maliciousness classes and a confidence value indicative of a level of confidence the software object is of the maliciousness class. Optionally, processor 801 computes the at least one new classification using a current classifier of plurality of cascaded classifiers 100. Processor 801 optionally uses a current set of classifier output thresholds, of the threshold sequence and associated with the current classifier, to control the flow of data from the current classifier to a next classifier, consecutive to the current classifier according to the identified cascade order. To control the flow of data, processor 801 optionally determines in in 1003 an output classification according to a result of comparing a plurality of confidence values of the at least one new classification to the current set of classifier output thresholds. Subject to failure to determine the output classification, in 1005 processor 801 optionally uses the next classifier, the at least one new classification and the data characteristic of the software object in a consecutive classification iteration of a plurality of classification iterations. Optionally, processor 801 repeats 1001, 1003 and 1005 in each of the plurality of classification iterations and in 1010 processor optionally stops execution of plurality of cascaded classifiers 100.

Reference is now made again to FIG. 9. In 920, processor 801 optionally outputs the output classification. Optionally, processor 801 outputs the output classification by storing the output classification on at least one non-volatile storage 803. Optionally, processor 801 outputs the output classification by sending at least one message indicative of the output classification to at least one other hardware processor via at least one digital communication network interface 802. Optionally, processor 801 outputs the output classification by displaying the output classification on at least one display device 804.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant genetic algorithms will be developed and the scope of the term genetic algorithms is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for training thresholds controlling data flow in a plurality of cascaded classifiers for classifying malicious software, comprising:
    in each of a plurality of iterations:
        computing a set of scores, each for one of a set of threshold sequences, each threshold sequence is a sequence of sets of classifier output thresholds, each set of classifier output thresholds used to control a flow of data from a first cascaded classifier of the plurality of cascaded classifiers, executed by at least one hardware processor, to a second cascaded classifier of the plurality of cascaded classifiers, executed by the at least one hardware processor, each score computed when classifying, using the respective threshold sequence, each of a plurality of software objects as one of a set of maliciousness classes;
        computing a set of new threshold sequences by applying a genetic algorithm to the set of threshold sequences and the set of scores; and
        using the set of new threshold sequences in a consecutive iteration of the plurality of iterations; and
    identifying a preferred threshold sequence, in a plurality of new sets of threshold sequences computed in the plurality of iterations, according to a plurality of sets of scores computed in the plurality of iterations.

2. The method of claim 1, wherein computing the set of new threshold sequences by applying a genetic algorithm comprises computing at least one new threshold sequence comprising at least part of each of a plurality of parent threshold sequences of the set of threshold sequences, each selected according to the set of scores.

3. The method of claim 2, wherein computing the at least one new threshold sequence further comprises modifying at least one set of classifier thresholds of the at least one new threshold sequence.

4. The method of claim 2, wherein the plurality of parent threshold sequences comprises at least two threshold sequences of the set of threshold sequences.

5. The method of claim 1,
    wherein the plurality of cascaded classifiers have an identified cascade order;
    wherein each set of classifier output thresholds of each of the set of threshold sequences is associated with one of the plurality of cascaded classifiers according to the identified cascade order; and
    wherein computing the at least one new threshold sequence comprises for each cascaded classifier of the plurality of cascaded classifiers adding to the at least one new threshold sequence a parent set of classifier output thresholds, associated with the cascaded classifier, of a parent threshold sequence of the plurality of parent threshold sequences.

6. The method of claim 5, wherein the plurality of parent threshold sequences comprises two threshold sequences of the set of threshold sequences.

7. The method of claim 1,
    wherein the plurality of cascaded classifiers have an identified cascade order;
    wherein each set of classifier output thresholds of each of the set of threshold sequences is associated with one of the plurality of cascaded classifiers according to the identified cascade order; and
    wherein computing the at least one new threshold sequence comprises for each maliciousness class of the set of maliciousness classes:
        for each cascaded classifier of the plurality of cascaded classifiers, adding to each new set of classifier output thresholds, associated with the cascaded classifier, of the at least one new threshold sequence, a threshold value associated with the maliciousness class from a parent set of classifier output thresholds, associated with the cascaded classifier, of a parent threshold sequence of the plurality of parent threshold sequences.

8. The method of claim 7, wherein each threshold sequence of the set of threshold sequences further comprises a classification evaluation order of the set of maliciousness classes; and
    wherein computing the at least one new threshold sequence further comprises computing at least one new evaluation order comprising at least part of each of a plurality of evaluation orders of the plurality of parent threshold sequences.

9. The method of claim 8, wherein computing the at least one new evaluation order using the plurality of parent threshold sequences comprises in at least one of a plurality of evaluation order iterations:
    identifying a longest common sequence of unplaced maliciousness classes in a plurality of classification evaluation orders of the plurality of parent thresholds; and
    placing the longest common sequence of unplaced maliciousness classes in the at least one new evaluation order according to a place of the longest common sequence of unplaced maliciousness classes in at least one of the plurality of classification evaluation orders.

10. The method of claim 1, wherein computing a score while classifying, using the respective threshold sequence, each of the plurality of software objects as one of the set of maliciousness classes comprises:
    computing a quality term indicative of an accuracy of classifying the plurality of software objects by the plurality of cascaded classifiers using the respective threshold sequence;
    computing a speed term indicative of an amount of cascaded classifiers used when classifying the plurality of software objects by the plurality of cascaded classifiers using the respective threshold sequence; and
    applying an identified weight function to the quality term, the speed term and an identified tradeoff factor, indicative of a tradeoff between classification quality and classification speed, to produce the score.

11. The method of claim 1, wherein the plurality of iterations comprises an identified amount of iterations.

12. A system for training thresholds controlling data flow in a plurality of cascaded classifiers for classifying malicious software, comprising at least one hardware processor adapted to:
    in each of a plurality of iterations:

computing a set of scores, each for one of a set of threshold sequences, each threshold sequence is a sequence of sets of classifier output thresholds, each set of classifier output thresholds used to control a flow of data from a first cascaded classifier of the plurality of cascaded classifiers, executed by the at least one hardware processor, to a second cascaded classifier of the plurality of cascaded classifiers, executed by the at least one hardware processor, each score computed when classifying, using the respective threshold sequence, each of a plurality of software objects as one of a set of maliciousness classes;

computing a set of new threshold sequences by applying a genetic algorithm to the set of threshold sequences and the set of scores; and using the set of new threshold sequences in a consecutive iteration of the plurality of iterations; and identifying a preferred threshold sequence, in a plurality of new sets of threshold sequences computed in the plurality of iterations, according to a plurality of sets of scores computed in the plurality of iterations.

13. The system of claim 12, further comprising at least one digital communication network interface connected to the at least one hardware processor;

wherein the first cascaded classifier of the plurality of cascaded classifiers sends the data to the second cascaded classifier of the plurality of cascaded classifiers via the at least one digital communication network interface.

14. The system of claim 13, wherein the at least one hardware processor is further adapted to output the preferred threshold sequence via the at least one digital communication network interface.

15. The system of claim 12, wherein the at least one hardware processor is further adapted to store the preferred threshold sequence on at least one non-volatile digital storage connected to the at least one hardware processor.

16. A system for classifying malicious software comprising at least one hardware processor adapted to execute a plurality of cascaded classifiers for classifying malicious software;

wherein the at least one hardware processor is adapted to:

accessing a threshold sequence, comprising a sequence of sets of classifier output thresholds, each set of classifier output thresholds used to control a flow of data from a first cascaded classifier of the plurality of cascaded classifiers to a second cascaded classifier of the plurality of cascaded classifiers, the threshold sequence trained by applying a genetic algorithm to at least one set of threshold sequences;

classifying a software object as one of a set of maliciousness classes by the plurality of cascaded classifiers using the threshold sequence; and outputting the classification of the software object.

17. The system of claim 16, wherein the threshold sequence is trained by applying a genetic algorithm to at least one set of threshold sequences by:

in each of a plurality of training iterations:

computing a set of scores, each for one of a set of training threshold sequences, each training threshold sequence is a sequence of sets of training classifier output thresholds, each set of training classifier output thresholds used to control a flow of data from a first training cascaded classifier of a plurality of training cascaded classifiers, executed by at least one other hardware processor, to a second training cascaded classifier of the plurality of training cascaded classifiers, executed by the at least one other hardware processor, each score computed when classifying, using the respective training threshold sequence, each of a plurality of training software objects as one of the set of maliciousness classes;

computing a set of new training threshold sequences by applying a genetic algorithm to the set of training threshold sequences and the set of scores; and using the set of new training threshold sequences in a consecutive iteration of the plurality of iterations; and identifying a preferred training threshold sequence, in a plurality of new training sets of threshold sequences computed in the plurality of iterations, according to a plurality of sets of scores computed in the plurality of training iterations.

18. The system of claim 16, wherein the plurality of cascaded classifiers have an identified cascade order;

wherein each set of classifier output thresholds of the sequence of sets of classifier output thresholds of the threshold sequence is associated with one of the plurality of cascaded classifiers according to the identified cascade order; and wherein classifying the software object using the threshold sequence comprises:

in each of a plurality of classification iterations:

computing, using a current classifier of the plurality of cascaded classifiers, at least one new classification in response to an input comprising data characteristic of the software object, each comprising a maliciousness class of the set of maliciousness classes and a confidence value indicative of a level of confidence the software object is of the maliciousness class; and using a current set of classifier output thresholds associated with the current classifier to control the flow of data from the current classifier to a next classifier, consecutive to the current classifier according to the identified cascade order, by:

determining an output classification according to a result of comparing a plurality of confidence values of the at least one new classification to the current set of classifier output thresholds; and subject to failure to determine the output classification, using the next classifier, the at least one new classification and the data characteristic of the software object in a consecutive classification iteration of the plurality of classification iterations.

\* \* \* \* \*